(12) United States Patent
Pankiewicz et al.

(10) Patent No.: US 9,656,911 B2
(45) Date of Patent: May 23, 2017

(54) MATERIALS FOR IMPROVED ADHESION RELATING TO FUNCTIONAL COLD END COATINGS (CECS) AND METHODS OF DETECTING SAME

(75) Inventors: Cindy Pankiewicz, Bridgeville, PA (US); Thirumalai Duraisamy, Pittsburgh, PA (US); Bertram Gardner, Apollo, PA (US); Ian Dudas, Pittsburgh, PA (US); David C. Kapp, Gibsonia, PA (US); Enos A. Axtell, III, Seven Hills, OH (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 918 days.

(21) Appl. No.: 13/579,057

(22) PCT Filed: Jan. 21, 2011

(86) PCT No.: PCT/US2011/021958
§ 371 (c)(1),
(2), (4) Date: Oct. 29, 2012

(87) PCT Pub. No.: WO2011/102936
PCT Pub. Date: Aug. 25, 2011

(65) Prior Publication Data
US 2013/0040392 A1 Feb. 14, 2013

Related U.S. Application Data

(60) Provisional application No. 61/304,962, filed on Feb. 16, 2010.

(51) Int. Cl.
*C03C 17/00* (2006.01)

(52) U.S. Cl.
CPC .......... *C03C 17/00* (2013.01); *C03C 2218/31* (2013.01); *Y10T 436/145555* (2015.01); *Y10T 436/200833* (2015.01)

(58) Field of Classification Search
None
See application file for complete search history.

(56) References Cited

U.S. PATENT DOCUMENTS

| | | | |
|---|---|---|---|
| 4,017,194 A | 4/1977 | Conroy et al. | |
| 4,135,014 A * | 1/1979 | Salensky et al. | 428/34.7 |
| 5,213,617 A | 5/1993 | Blizzard | |
| 5,453,304 A * | 9/1995 | Scholes | 427/469 |
| 5,888,622 A * | 3/1999 | Pinell et al. | 428/195.1 |
| 6,403,175 B1 | 6/2002 | Speier et al. | |
| 6,790,532 B1 * | 9/2004 | Gier | C03C 17/30 428/447 |
| 6,967,716 B1 | 11/2005 | Cochran et al. | |
| 2001/0004870 A1 | 6/2001 | Naoumenko et al. | |
| 2004/0048032 A1 * | 3/2004 | Ankele | B29C 43/203 428/68 |
| 2005/0037501 A1 * | 2/2005 | Meyer et al. | 436/5 |
| 2005/0069714 A1 * | 3/2005 | Hart | B05D 7/532 428/411.1 |
| 2007/0015893 A1 * | 1/2007 | Hakuta | B32B 17/1055 528/34 |
| 2007/0042139 A1 * | 2/2007 | Cooper | C09D 5/22 428/29 |
| 2007/0105991 A1 * | 5/2007 | Jonas | C08J 3/05 524/100 |
| 2007/0134503 A1 | 6/2007 | Espinosa | |
| 2009/0042037 A1 * | 2/2009 | Liggett | B32B 5/022 428/421 |
| 2009/0104387 A1 * | 4/2009 | Postupack | C03C 17/005 428/34.6 |
| 2010/0203271 A1 | 8/2010 | Di Giuseppantonio et al. | |

FOREIGN PATENT DOCUMENTS

EP 1178021 2/2002

* cited by examiner

*Primary Examiner* — Robert Vetere
(74) *Attorney, Agent, or Firm* — Rankin, Hill & Clark LLP

(57) ABSTRACT

Various agents for improving adhesion of cold end coatings on glass surfaces are described Also described are agents for improving bonding between cold end coatings and organic inks. And, methods and related detection solutions for detecting the presence of cold end coatings on a substrate such as a glass bottle are disclosed. Additionally, particular additives and primers are described that can be applied onto cold end coatings for improving adhesion thereto.

16 Claims, No Drawings

MATERIALS FOR IMPROVED ADHESION RELATING TO FUNCTIONAL COLD END COATINGS (CECS) AND METHODS OF DETECTING SAME

CROSS REFERENCES TO RELATED APPLICATIONS

The present application claims priority upon U.S. provisional application Ser. No. 61/304,962 filed Feb. 16, 2010.

FIELD OF THE INVENTION

The present invention relates to improving adhesion of cold end coatings (CECs) on glass surfaces, improving bonding between organic inks and CECs and glass surfaces, and detection methods for CECs.

BACKGROUND OF THE INVENTION

The beverage bottle industry applies a lubricious transparent cold end coating (CEC) onto formed glass bottles to prevent surface damage and caustic attack of the glass bottles. Screen printed organic inks are typically applied directly upon a CEC. Unfortunately, the CEC can interfere with bonding of the organic ink and adhesion at the glass surface. Therefore, various materials have been evaluated as cross-linkers to promote adhesion on CEC's, on glass surfaces, and for use in other additives. As a result, particular chemistries and procedures for application of CEO's at bottling plants have been recommended. The basic chemistry necessary for improvement of bonding between the organic ink and glass surface is the addition of a silane to a CEC composition. The adhesion improvement between the organic ink layer and the CEC is mainly based on the cross-linking function of the materials.

Quality issues may arise with the CEC that can significantly impact hot caustic durability performance in returnable glass bottles. A bottler or decorator typically experiences significant field failures with many commercially available inks. This is likely due to poor CEC quality in terms of adhesion on glass and bonding with the organic inks. As noted, the CEC is transparent, as it is made of various clear mediums containing fatty acids, polymers, etc. Thus, there is currently no easy way to ensure that the CEC is present on the glass surface, that it contains the necessary silane, that it is applied uniformly, and/or that the CEC solution or coated bottles have not aged or degraded to an extent such that the silane no longer has the requisite surface functionality.

Therefore, the objectives of the present invention include improving adhesion of CECs on glass surfaces, improving bonding with organic inks, and providing fast and easy test methods for detection of the invisible and functional CEC and its components.

SUMMARY OF THE INVENTION

The difficulties and drawbacks associated with currently known CECs are addressed by the present invention.

In one aspect, the present invention provides an additive for incorporating in a cold end coating (CEC) composition for improving adhesion thereto. The additive is one or more organo metalate agents.

In another aspect, the present invention provides a pretreatment composition for application onto a glass surface. The pretreatment composition serves to improve characteristics of a cold end coating (CEC) applied subsequently thereto. The pretreatment composition includes one or more silane agents.

In yet another aspect, the present invention provides a composition for detecting the presence of a cold end coating (CEC). The composition includes at least one agent selected from the group consisting of UV optical brighteners, food color dyes, natural dyes, infrared active dyes and/or pigments, forensic indicators, and combinations thereof.

In still another aspect, the present invention provides a primer composition for improving adhesion to a cold end coating (CEC). The primer composition comprises one or more silane agents in combination with one or more titanate agents.

And, in a further aspect, the present invention provides a method of detecting the presence of a cold end coating using a forensic indicator. The method comprises applying a composition comprising a forensic indicator onto a surface in question. The method also comprises reviewing the surface for development and visual indication of the forensic indicator.

In still a further aspect, the present invention provides a method of detecting the presence of a cold end coating. The method comprises applying a composition for detecting the presence of a cold end coating (CEC). The composition includes at least one agent selected from the group consisting of UV optical brighteners, food color dyes, natural dyes, infrared active dyes and/or pigments, forensic indicators, and combinations thereof onto a surface in question. The method also comprises directing UV light to the surface after applying the composition. And, the method comprises reviewing the surface for one or more visual indicators.

The present invention also provides a method for improving adhesion by an ink to a cold end coating (CEC). The method comprises providing a cold end coating formulation. And, the method comprises incorporating one or more organo metalate agents into the formulation.

In still another aspect, the present invention provides a method for improving adhesion by an ink to a cold end coating (CEC). The method comprises providing a substrate having a cold end coating thereon. The method also comprises providing a primer composition including at least one silane and at least one titanate. And, the method comprises applying the primer composition to the substrate and the cold end coating.

In an additional aspect, the present invention provides a method for promoting bonding between an ink and a glass substrate. The method comprises providing a cold end coating composition. The method also comprises incorporating an effective amount of at least one silane agent into the cold end coating composition. The silane agent is selected from the group consisting of amino silanes, epoxy silanes, chlorosilanes, methoxy silanes, ethoxy silanes, alkoxy silanes, acyloxy silanes, dipodal silanes, and combinations thereof. Upon application of the cold end coating composition and silane agent incorporated therein onto the glass substrate and forming of a cold end coating, and upon depositing ink upon the coating, the bonding between the ink and the glass substrate is promoted.

As will be realized, the invention is capable of other and different embodiments and its several details are capable of modifications in various respects, all without departing from the invention. Accordingly, the description is to be regarded as illustrative and not restrictive.

DETAILED DESCRIPTION OF THE EMBODIMENTS

In accordance with the present invention, materials suitable for promoting bonding adhesion of functional CECs with glass surfaces and organic inks are disclosed. Various organo metalates have been discovered as potential cross-linkers for improved bonding between CEO's and organic inks and inert surfaces such as glass Furthermore, a pretreatment composition for a glass surface is described containing one or more particular silane agents, which improves characteristics of a CEC applied onto the pretreatment layer.

Also described herein are reagents suitable for use as detectors of CECs and for use in a simple method for qualifying a CEC and its components on glass surfaces. Another aspect of the present invention is the utilization of visible and ultraviolet (UV) functional pigments or dyes in the CECs and/or its silane solution and/or composition for easy detection. These can include UV optical brighteners, food color dyes, and natural dyes from vegetables, algaes, and other stains. UV optical brightener dyes and pigments along with infrared (IR) active dyes and pigments can also be utilized to detect the presence and application uniformity of the CEC's. The present invention includes use of a forensic detection solution to determine the presence and functionality of primary amine groups attached to silanes, one of the components that are used to improve interfacial bonding between a glass surface and the coating, in solutions and on the glass surface itself. Also, the present invention includes the use of an aqueous potassium permanganate ($KMnO_4$) solution to qualitatively identify the primary amine groups attached to the silane coupling agents.

In addition, various additives and primers are described which can be applied onto a CEO to improve adhesion of inks thereto.

Each of these aspects are described in greater detail as follows.

Organo Metalates and CEC's

It has been surprisingly discovered that the caustic performance, i.e. resistance by a glass substrate to degradation from exposure to a caustic environment, is significantly improved by incorporating one or more organo metalates into a CEC, and cross-linking the resulting CEC. In a preferred embodiment according to the present invention, the materials suitable for cross-linking the CECs are organo metalates, preferably organo transition metalates, and most preferably organo titanates and zirconates. These agents can be used in combination with each other or with other components. Organically chelated organo metal oxides have at least two main functions, cross-linking and adhesion. These agents can cross-link polymers by forming stable bonds with the functional groups (eg. —OH) of polymeric resins. In a molecule of a particular organo metalate, the presence of two or more labile alkoxy groups provide the cross-linking activity. The cross-linking requires the presence of functional groups on the resin used in the organic ink and in the film (CEC) to which the ink adheres. The alkoxy groups react with the hydroxyl groups of both the resin (used in the ink) and the film (CEC) to form a cross-link, thereby bonding the ink to the polymer surface. Organo metalates can act as adhesion promoters even on unreactive substrates such as glass, metal, etc. and functional coatings.

Pretreatment Compositions and Silanes for CECs

It has also been discovered that adding one or more specific silane coupling agents to a cold end coating (CEC) composition significantly promotes bonding between an ink and the underlying glass surface. Thus, such silanes can serve as pretreatment agents for CEC's. A variety of silane agents can be used such as amino silanes, epoxy silanes, chlorosilanes, methoxy silanes, ethoxy silanes, alkoxy silanes, acyloxy silanes, and/or dipodal silanes. These agents can be used in any combination with each other or in combination with other agents. It is preferred to use glycidoxypropyltrialkoxy silane, and γ-aminopropyltrialkoxy silane either singly or in combination. The incorporation of these silane agents also improves the caustic performance of the CEC. Various related methods are provided in accordance with the invention.

Detection Methods, Compositions and Forensic Agents

The present invention also provides methods and compositions for detecting the presence of a CEC and in certain applications, assessing one or more characteristics of the CEC. Specifically, one or more reagents and/or additives are incorporated into a CEC, thereby facilitating performing a detection method as described herein.

Reagents suitable for use as detectors and for use in a relatively simple method for qualifying functional CECs and components thereof on a glass surface are also described herein. The reagents include UV functional optical brighteners, functional dyes and/or pigments, forensic class chemicals such as ninhydrin, and a solution of potassium permanganate having reactive functional groups or ions that react with components of functional coatings producing differential color change. Any of these agents or components can be used singly or in combination with themselves or with other agents or components. Examples of dyes include but are not limited to food color dyes, natural dyes, infrared active dyes and the like. Optical brightening agents (OBAs) are also included and are generally dyes that absorb light in the UV region of the electromagnetic spectrum, and re-emit light in a specific wave length.

Preferably, the optical brightener additives which are based on stilbenes, coumarines or azolines, are utilized to detect the presence of CECs. These can be used singly or in combination. More specifically, Keystone Keyfluor white CBS-X (yellow) (CBS-X) and Cartax CXDP P (blue) (CXDPP) optical brightener/fluorescent pigment are used in the present invention. Keystone Keyfluor white CBS-X is believed to be an oxazole and is available from Keystone Aniline Corp. of Chicago, Ill. Cartax CXDP is available from Clariant GmbH of Augsburg Germany. Cartax CXDP is believed to be a substituted benzo-oxazinone. Solutions of CBS-X and CXDP P were used at 0.1% but other dyes/pigments can also be used and at various levels. By using a UV lamp, a solution previously sprayed onto a warmed glass to form a somewhat clear coating, fluoresces to bright blue color with CBS-X, and neon yellowish green with CXDP P, indicating the presence of the coating (CEC) on the glass.

Another embodiment of the present invention relates to a forensic detection solution to determine the presence and functionality of primary amine groups attached to silanes on a glass surface. The reagents are made as aqueous and/or solvent solutions, and subsequently sprayed, dripped, or otherwise applied on the surface of CECs for detection. A preferred forensic reagent or indicator utilized in the present invention is ninhydrin (formula I). The reaction of ninhydrin with amines is highly specific and the absorption characteristics of the formed chromophore follow Beer's law. Thus, reagents based on ninhydrin are an excellent choice for detection and quantification of amines and amino acids that may be present in a CEC.

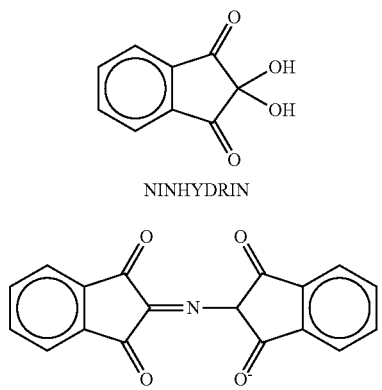

NINHYDRIN

The ninhydrin reagent solution is preferably utilized as an aqueous alcoholic solution. A ninhydrin concentration range of 2-3% prepared in n-butanol which is acidified with glacial acetic acid is preferred, as this reagent in solvents is more sensitive towards reaction with amines. Ninhydrin reacts slowly at room temperature. Consequently, elevated temperatures are employed to reduce the conversion time to about one minute. The chromophore (formula II) formed as a result of the reaction of ninhydrin with amino groups, exhibits different colors. The reaction proceeds via a condensation reaction between carbonyl and amino groups, and depending on the nature of the amino group attached on the silane, such as primary or secondary, and nature and chain length of carbon between the amino group and the silane, the resulting color varies between purple, pink, violet, and blue. The method of detection is convenient and relatively fast, as it precisely results merely by change of color due to heating within a few minutes.

In addition to or instead of ninhydrin, one or more ninhydrin derivatives can be used. For example, the present invention includes but is not limited to the use of the following ninhydrin derivatives: benzoninhydrin, thieno[f] ninhydrin, naptho[f]ninhydrin, bis-ninhydrin analogs, aryl and heteroaryl ninhydrin analogs, ninhydrin hemiketals, and combinations thereof. Benzoninhydrin is preferred for use with zinc salts. 5-methoxy/5-methylthio ninhydrin exhibits intense fluorescence. Thieno[f]ninhydrin exhibits good chromogenic and fluorogenic properties. Bis-ninhydrin analogs can be utilized to provide polymeric Ruhemann's purple species. Aryl and heteroaryl ninhydrin analogs exhibit fluorogenic properties without metal ion treatment. Ninhydrin hemiketals may be preferred for particular applications owing to their ability to detect latent fingerprints or chemical moieties on thermal paper without background staining. Additional details associated with ninhydrin reagents are provided in U.S. Pat. No. 4,274,833.

In another embodiment of the present invention, an aqueous potassium permanganate solution is used to qualitatively detect the primary amine groups which are attached to the silane coupling agent(s). Thus, potassium permanganate is another forensic indicator, as described herein. A simple test with dilute permanganate solution yields significant differences among the silanes. This reagent indicates the presence of primary amines by changing its color from purple to brown as aliphatic primary amines are known to reduce purple $Mn^{7+}$ ions to brown $Mn^{2+/3+}$ Thus, this reagent may serve as a suitable forensic indicator.

The present invention also includes the use of one or more other forensic agents in addition to, or instead of, the agents noted herein. For example, suitable forensic agents can also include 1,8-diazafluorene-9-one (DFO), 1,2-indanediones, and combinations thereof. 1,8-diazafluorene-9-one (DFO) reacts with alpha-amino acids to produce a red product. The red product is analogous to Ruhemann's purple product resulting from ninhydrin. In contrast to ninhydrin, DFO develops fingerprints or chemical moieties that are highly fluorescent without secondary treatment with metal salts. Compounds or the class of 1,2-indanediones are more sensitive than DFO and react faster thereby typically revealing more information. In addition to being more sensitive, the cost of these reagents is generally less than that of DFO. Moreover, 1,2-indanediones typically do not require precise development conditions to prevent thermal decomposition.

Additives and Primers for Improving Adhesion

Another aspect of the present invention relates to a primer composition that if applied onto a CEC, significantly improves adhesion of inks subsequently applied thereto. Preferably, the primer composition includes one or more silanes and one or more titanates. Use of the primer also promotes caustic performance of the resulting coated substrate or bottle. In this embodiment of the invention, the polymer resin itself, i.e. the CEC, serves as an adhesive. The resin in this embodiment can include conventional adhesive components such as epoxies and polyesters.

EXAMPLES

Example 1

Caustic Performance of Organo Titanate Cross-Linked CEC

A HTP white ink formulation, referred to herein as "Ink A" comprised of EPON Resin 1001, an epoxy resin solids solution, and EPON Resin 828, a general purpose epoxy resin, both available from Hexion Specialty Chemicals in Columbus, Ohio, with the addition of 3% organo titanate, VERTEC P12, available from Johnson Matthey Catalysts of London, UK, was prepared and designated as sample 2 and a similar formulation however using 3% organo titanate, VERTEC 1A10 was prepared and designated as Sample 1. Testings were performed on a T5 stearate coating and on a silane/T5 coating. "T5 stearate" is a stearate coating composition of an aqueous solution of ethoxylated stearic acid glycol ester available under the designation TEGOGLAS from Arkema, Inc. of Philadelphia, Pa.

Caustic protocols: Tests started with a 2-3% NaOH aqueous solution at 65-70° C. containing a washing additive, and used a several minute soak.

There were no failures, so testing was made more severe by increasing soak time, temperature, and concentration. Tests were taken to failure.

Results indicated that the titanates exhibited equal or superior performance than that of the T5 coating alone and the silane/T5 coating.

Example 2

Pretreatment Cold End Coating for Glass Adhesion in Caustic

Adding silane coupling reagents such as SILQUEST A-187 (glycidoxypropyltrialkoxy silane), and SILQUEST A-1100 (γ-aminopropyltrialkoxy silane), etc., both available from Momentive Performance Materials of Albany, N.Y., to the cold end coating (CEC) promotes ink bonding to the glass surface. The best performance was achieved by adding 0.2% SILQUEST A-1100 into a 0.2% stearate solution (modified Tego-5 available from Evonik Degussa GmbH of Parsippany, N.J.). This formed Sample 3. EPON Resin 1001F, EPON Resin 828, and similar epoxy resins that comprise formulations such as Ink A, were used and a white epoxy HTP ink was screen printed onto glass and cured at 400° F. (204° C.) for 30 minutes. Glass panels were then subjected to a caustic bath containing 2-5% NaOH and 0.25% of an additive (BW61, an anti-rust additive from Johnson Diversey, Inc., of Sturtevant, Wis., or similar), at 65-80° C. The panels were soaked for several minutes followed by a rinse, and then the cycle was repeated. Samples lasted beyond 30 cycles without delamination. A varied caustic test utilizing up to a 5 hour soak instead of short minute cycles was also used to determine the coatings' resistance to caustic washings. Details of the various pretreatments are described as follows.

SILQUEST A-1100 was mixed 50/50 with ethanol and pH adjusted with acetic acid to a neutral pH. This solution was then added to a concentration of 0.2% into a 0.2% T5 solution and sprayed onto warmed (approximately 95° C.) glass panels.

SILQUEST A-187 was mixed 50/50 with ethanol and pH adjusted with acetic acid to a neutral pH. This solution was then added to a concentration of 0.2% into the 0.2% T5 solution and sprayed onto warmed (approximately 95° C.) glass panels.

T5 CEC (stearate) was used to form a 0.2% solution in deionized (DI) water. The solution was then sprayed onto warmed (approximately 95° C.) panels.

In test 1, 30 cycles as per the caustic protocol previously noted were performed. The failure cycle is listed below in Table 1.

TABLE 1

Test 1

| 2 panels of each condition: | Ink A (no. of cycles) |
|---|---|
| Tinside - no pretreatment | 30 |
| Airside - no pretreatment | 24 |
| Tinside - A-187 | PASS |
| Airside - A-187 | PASS |
| Tinside - A-1100 | PASS |
| Airside - A-1100 | PASS |

In test 2, 30 cycles per the caustic protocol were performed and the failure cycle is listed below in Table 2.

TABLE 2

Test 2

| 2 panels of each condition: | Ink A |
|---|---|
| Tinside - T5 CEC | 23 |
| Airside - T5 CEC | 16, 19, 19, 23, 24 |

This data demonstrates that T5 CEO provides 16-24 cycles prior to failure, no CEC yields 24-30 cycles prior to failure, and silane pretreatments provide more than 30 cycles before failure.

Example 3

Addition of UV Active Indicator to the Pretreatment/CEC (with Caustic Durability) and Detection Method 0.01% of the brightener additive CBS-X, 0.01% of the brightener additive CXDPP, or other dyes/pigments solutions can be used to detect the CECs. The solution was sprayed onto warmed glass to form a somewhat clear coating. By detection with a UV lamp, the pretreatment on the glass exhibited a blue color with CBS-X, and a neon yellowish green with CXDPP indicating the presence of a CEC on the glass. The previously noted Sample 3 white HTP ink was screen printed onto the glass and cured at 400° F. (204° C.) for 30 minutes. Glass panels were then subjected to a caustic bath of 2-5% NaOH containing 0.25% BW61, at 65-80° C. for a several minute soak. The panels were then rinsed, and the process repeated. Samples lasted beyond 30 cycles. In addition, the fluorescence was still present under the ink label after 30 wash cycles by UV lamp detection.

Caustic Testing

Testing was based on the caustic protocol given in Example 2.

Several minute cycles at 65-80° C. in 2-5% NaOH solution bath with the additive 0.25% Johnson Diversey BW61 were performed. The results of this investigation are set forth below in Table 3.

TABLE 3

Test 3

| Panels tested | No. of Panels | No. of Caustic Cycles |
|---|---|---|
| Sample 3 T-5 only | 4 Tinside | >30 with no failures |
| Sample 3 Pretreatment Solution | 4 Tinside | >30 with no failures |
| Sample 3 Tinside | 4 w/Cartax Pigment | >30 with no failures |
| Sample 3 Tinside | 4 w/Keystone Pigment | >30 with no failures |

The results of caustic testing set forth above in Table 3 meet caustic protocol qualifications and demonstrates that the OBA's/fluorescent pigments do not affect the caustic durability.

Example 4

Detection of Silane in the CECs by Use of Ninhydrin

A 2% ninhydrin solution was formed in n-butanol by gently dissolving for about 30 minutes. The resulting green-yellow solution was acidified with glacial acetic acid. The final composition of acetic acid was approximately 2% by volume. Testing was performed on both glass panels and bulk solutions using old and fresh silane formulations with and without stearate ingredient. Testing samples were optionally heated on a hotplate or placed in a preheated oven after applying the ninhydrin solution.

A 2% ninhydrin solution was placed on the glass having a pretreatment CEC containing SILQUEST A-1100 on the glass surface. When the glass was heated, a reaction occurred and the yellowish-clear drop changed to a purplish color. This indicates that the pretreatment CEC is still on the glass or bottle and is active.

To check activation of the pretreatment solution itself, a drop of 0.2-2.0% pretreatment CEC was placed on the glass, and then a drop of the 2% ninhydrin solution was placed on top of the pretreatment drop. When heated, a change in color from yellowish-clear to purple-brown occurs when an amine is detected. This can be performed upon wet on wet coatings or wet on dried coatings.

Example 5

Use of Potassium Permanganate $KMNO_4$

The following test was used to detect the presence of silane, such as SILQUEST A1100, on a pretreated glass surface using $KMnO_4$. This reagent will indicate the presence of a primary amine group attached on the silane by changing its color from purple to brown.

A 0.2 N $KMnO_4$ solution was prepared by dissolving an appropriate amount of crystals of $KMnO_4$ in distilled water. Testings were performed on both glass panels and bottles using old and fresh silane formulations with or without a stearate ingredient. To speed up the reaction of amino group on the permanganate ion, the test samples were heated on a hot plate or in a preheated oven. The following are the relevant observations. Color change from pink to brown was noticed with fresh silane formula on glass panel and in bulk solution indicating the presence of silane in the CEC formulation. A similar change in color was observed when three or six months old bulk formulation was used. No color change was seen when only stearate solution was used on both glass panel and bulk.

Example 6

Pretreatment Cold End Coating for Glass Adhesion in Caustic Pretreatment

Silane pretreatment does not adhere to PE/CEC and does not pass 26 cycles of caustic test. However, primers made with a combination of silane and titanate can improve the cure of adhesion to polyethylene (PE) coated surfaces.

A primer consisting of 3 glycidoxy-propyl-tri-methoxy and titanium acetyl-acetonate having a ratio of 2:1 of silane to titanate was demonstrated to promote adhesion to PE and improve caustic resistance. Other titanates such as modified tetra-isopropyl titanate, tetra-butyl titanate, and titanium phosphate improved curing of organic coatings or inks.

A set of bottles were treated with a silane/titanate primer and air dried to form a continuous layer. An indicator of 4,4,-bis(2 benzoxazolyl) stilbene was incorporated to show that the primer was evenly applied. The primer and indicator were prepared as per the following formula: 5 parts of indicator were mixed with 60 parts of di-ethylene glycol mono butyl ether. In a separate container, 22 parts of 3 glycidoxy-propyl-tri-methoxy silane were added to 11 parts of 5 parts of chelated titanate such as titanium acetyl-cetonate, modified tetra-butyl titanate, tetra-isopropyl titanate or titanium phosphate. Then 5 grams of the indicator was added. This mixture was diluted with 120 parts of deionized (DI) water.

The primer was applied by spray to bottles and allowed to air dry. The coated bottles were kept at room temperature until they were decorated with an epoxy based organic ink, i.e. previously described Ink A. Following the decoration, the bottles were baked for 30 minutes at 400° F. (204° C.). The bottles were observed under a UV light and the indicator showed good coverage by the silane/titanate primer.

The bottles were immersed into a caustic bath for 7 minutes. The bottles were then removed, rinsed with tap water followed by DI water and inspected for damage, such as removal of coating, eroding of the edges of letter(s) or discoloration. If no damage was observed then the bottles were returned to the warm caustic bath and the 7 minute cycle was repeated until failure or 26 cycles were achieved.

Bottles coated with silane/titanate primer passed 24 and 30 cycles, whereas bottles decorated with Ink A directly over PE failed after 16 and 21 cycles. The caustic bath consisted of 2-5% NaOH, 0.25% BW-61 surfactant and was held at 65-70° C. for the duration of the test.

Example 7

Determination of Optimum Ratio of Silane/Titanate for Promoting Adhesion to PE/CEC Coated Bottles Four primers were prepared by using different ratios of silane to titanate. The ratios were (i) 2 parts of silane to 1 part of titanate, and (ii) 1 part of silane to 2 parts of titanate. Both ratios were duplicated with two different indicators that are visible under UV light.

The indicators were dispersed in di-ethylene glycol mono butyl ether (5:60) and 5 grams were added to each of the silane/titanate solutions. Deionized (DI) water was used to dilute the primer. The bottles, i.e. PE/CEC coated, were washed with a soak solution and rinsed with tap water and dried in an oven before coating. The primers were sprayed on a set of four bottles and air dried before decoration.

The bottles were decorated with two inks, Ink A (white) and a similar ink, referred to herein as Ink B, however having a different color (red) and these bottles were baked at 30 minutes at 400° F. (204° C.).

The bottles were immersed in a proprietary caustic batch and held for 1 hour at 65 to 70° C. After one hour, bottles with 1 part of silane to 2 parts of titanate showed some adhesion loss while bottles with 2 parts of silane and 1 part of titanate were clearly less affected by the exposure.

Both indicators were visible under the organic ink under a UV light.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous methods and approaches. However, it will be appreciated that various changes in the details, materials and arrangements of components or steps, which have been herein described and illustrated in order to explain the nature of the invention, may be made by those skilled in the art without departing from the principle and scope of the invention, as expressed in the appended claims.

What is claimed is:

1. A glass substrate coated with a cold end coating composition, the cold end coating composition including:
    an additive for improving adhesion of an ink to the cold end coating composition, the additive being one or more organo metalate agents, and at least one agent that indicates a presence of the cold end coating on the glass substrate after having been subject to degradation due to age, surface damage, or hot caustic attack, the at least one agent being selected from the group consisting of UV optical brighteners, UV active pigments, and combinations thereof.

2. The glass substrate of claim 1, wherein the organo metalate agents are organo transition metalates which are selected from the group consisting of organo titanates, organo zirconates, and combinations thereof.

3. The glass substrate of claim 1, wherein the additive further comprises at least one silane agent.

4. The glass substrate of claim 3, wherein the at least one silane agent are selected from the group consisting of amino silanes, epoxy silanes, chlorosilanes, methoxy silanes, ethoxy silanes, alkoxy silanes, acyloxy silanes, dipodal silanes, and combinations thereof.

5. The glass substrate of claim 4, wherein the at least one silane agent is an alkoxy silane selected from the group consisting of glycidoxypropyltrialkoxy silane, γ-aminopropyltrialkoxy silane, and combinations thereof.

6. The glass substrate of claim 3, wherein a weight ratio of an amount of the at least one silane agent to an amount of the one or more organo metalate agents in the cold end coating composition is 2:1.

7. The glass substrate of claim 6, wherein the at least one silane agent is included in the cold end coating composition at a concentration of 0.2 wt %.

8. The glass substrate of claim 1, wherein the agent includes UV optical brighteners selected from the group consisting of stilbenes, coumarines, azolines, and combinations thereof.

9. The glass substrate of claim 1, wherein the composition includes at least one forensic indicator for detecting the presence of a cold end coating.

10. The glass substrate of claim 9, wherein the at least one forensic indicator is selected from the group consisting of ninhydrin, ninhydrin derivatives, potassium permanganate, 1,8-diazafluorene-9-one, 1,2-indanediones, and combinations thereof.

11. The glass substrate of claim 10, wherein the at least one forensic indicator is ninhydrin or a ninhydrin derivative.

12. The glass substrate of claim 1, wherein the cold end coating composition further includes an aqueous solution of ethoxylated stearic acid glycol ester.

13. The glass substrate of claim 12, wherein the aqueous solution has a concentration of 0.2 wt % of ethoxylated stearic acid glycol ester.

14. The glass substrate of claim 1, wherein the at least one agent is included in the cold end coating composition at a concentration of 0.01 wt %.

15. The glass substrate of claim 1, further comprising an organic ink applied over the cold end coating composition.

16. A primer composition for improving adhesion of an ink to a cold end coating on a glass substrate, the primer composition comprising:
   an additive including one or more silane agents, and one or more organo metalate agents, and
   at least one agent that indicates a presence of a cold end coating on a glass substrate after having been subject to degradation due to age, surface damage, or hot caustic attack, the at least one agent being selected from the group consisting of UV optical brighteners, UV active pigments, and combinations thereof.

* * * * *